Jan. 15, 1952  J. C. G. COSSEY ET AL  2,582,747
COUPLING FOR RAILWAY AND LIKE VEHICLES
Filed Feb. 25, 1948  3 Sheets-Sheet 1

Inventors
J. C. G. Cossey
G. H. Smith
By Glascock Downing Seckel
attys

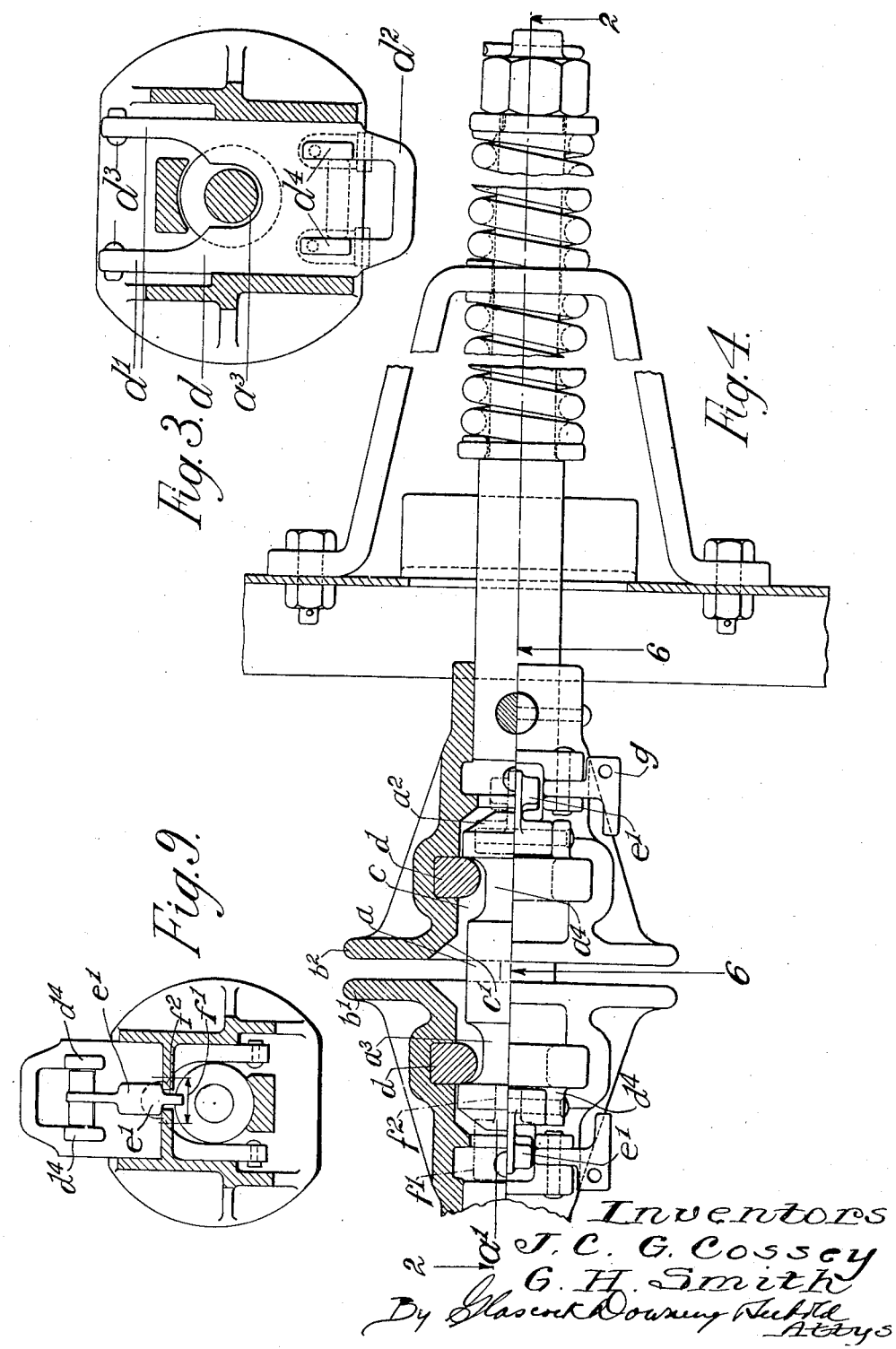

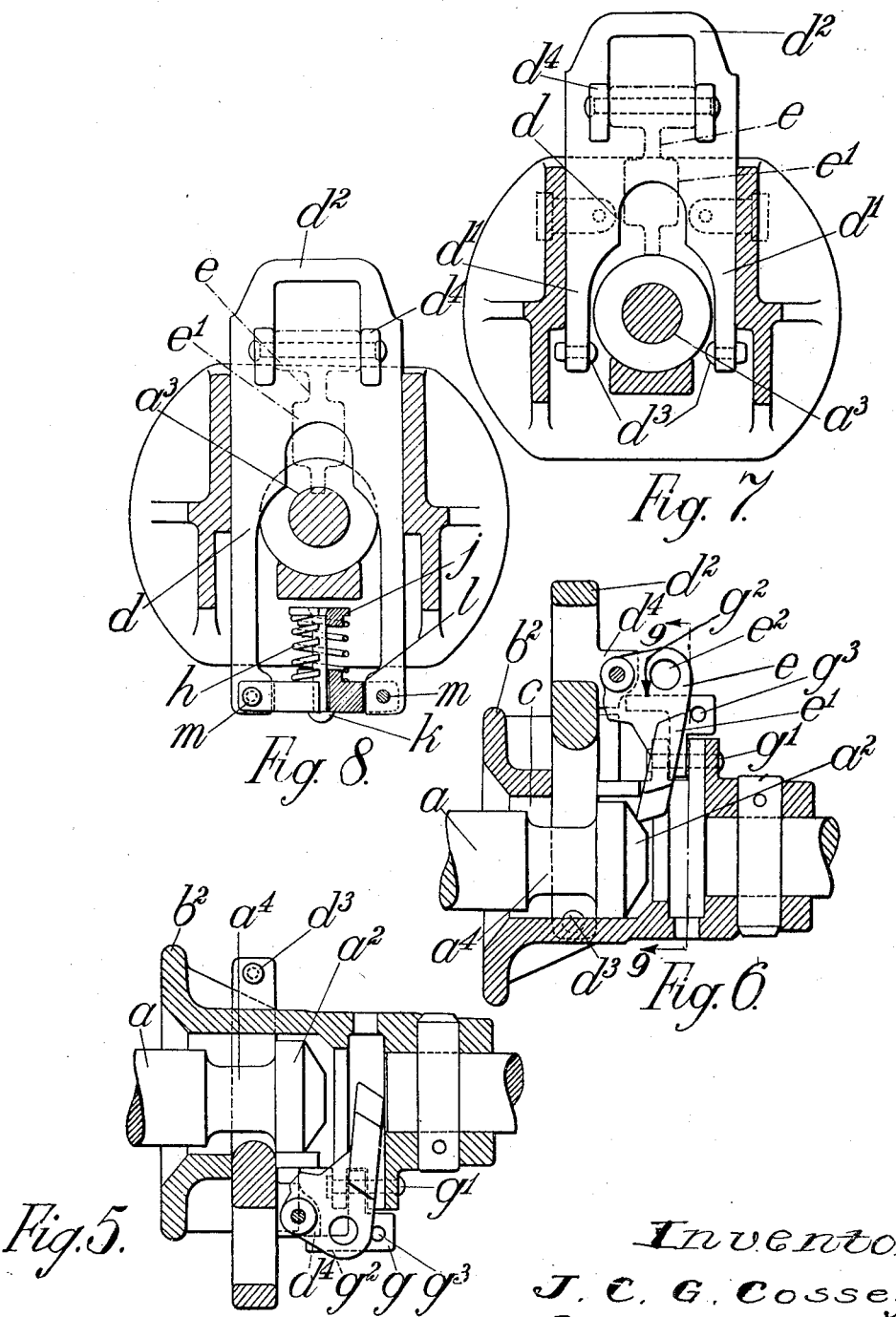

Patented Jan. 15, 1952

2,582,747

UNITED STATES PATENT OFFICE 2,582,747

COUPLING FOR RAILWAY AND LIKE VEHICLES

John Cecil George Cossey and George Henry Smith, Wolverhampton, England, assignors to A. B. C. Coupler & Engineering Company Limited, Wolverhampton, England Application February 25, 1948, Serial No. 10,654
In Great Britain March 6, 1947

12 Claims. (Cl. 213—92)

This invention relates to couplings for connecting railway and like vehicles.

In the specification of our co-pending British application No. 17,744 of 1945 we have described and claimed a form of coupling comprising a coupling member adapted to be inserted into the coupler head of the vehicle, and a coupling pin adapted to prevent removal of the member from the head while permitting rotation of the coupling member relative to the coupling head, the arrangement being such that while adaptable for general application it will be particularly suitable for the coupling together of a train or series of vehicles designed to be emptied by tipping about a longitudinal axis since, with the said couplings, each of the series of wagons can be moved to the tipping station and tipped in turn without the necessity for disconnection from or re-connection with the adjacent wagons in the train or series.

The present invention has for its object to devise further improvements in such couplings, and the invention consists in the provision of means by which the operation of coupling may be performed automatically.

The invention also consists in an automatic coupling according to the preceding paragraph in which the act of uncoupling two vehicles will automatically set the coupling in position for automatic coupling.

Further features of the invention will be apparent from the description given hereafter.

The accompanying drawings illustrate one mode of carrying out the invention.

Figure 3 is a similar view to Figure 1 but showing the coupler inverted.

Figure 4 is a plan, partly in section on the line 4—4 of Figure 1.

Figures 5 and 6 are fragmentary sectional views showing details.

Figure 6 is on the line 6—6 of Figure 4 and Figure 5 is a similar view with the coupling inverted.

Figure 7 is a similar view to Figure 1 on the line 7—7 of Figure 2 but showing the coupler set in position for uncoupling, Figure 8 shows an alternative form of coupling pin, and, Figure 9 is a section taken on line 9—9 of Figure 6.

In carrying our invention into effect in one convenient manner we form our improved coupling with a coupling member in the form of a pin adapted to be inserted into the coupler heads of adjacent vehicles, the pin being formed with a central cylindrical portion $a$ and two enlarged end portions or heads $a^1 a^2$, the said portions being separated from one another by grooved portions $a^3 a^4$ of reduced diameter. Each of the head members $a^1 a^2$ is preferably chamfered or made somewhat conical upon its outer face and the coupler heads $b^1 b^2$ upon the vehicles each has a cylindrical bore or chamber $c$ therein, the outer end of which is preferably flared as at $c^1$, the arrangement facilitating the entry of a coupling member into its coupler. The coupler head of the vehicle is formed with a hole or holes passing therethrough in a vertical plane parallel with the face of the coupler head and into this hole or these holes a coupling pin $d$ in the form of a U piece is adapted to be inserted.

The inverted U-shaped coupling pin in a preferred construction is of substantially rectangular cross section, the lower ends of the legs $d^1$ being spaced sufficiently far apart to allow the enlarged portions or heads $a^1 a^2$ of the coupling members to pass between them, while the upper ends of the legs are spaced closer together and the insides of these upper parts are suitably shaped to pass into the inner grooved portion $a^3 a^4$ of the coupling member in front of the heads thereon, thus preventing withdrawal of the coupling member from the coupler head although permitting rotation of the coupling member within the coupler head. Conveniently the coupling pin may be provided at its upper part with a handle $d^2$ to enable it to be lifted to the ready for uncoupling position (shown in Figure 7) and means such as rivets $d^3$ passing through the lower ends of the legs prevent removal of the pin from the coupler head.

The coupling pin also has rearwardly extending projections or lugs $d^4$ between which is pivotally mounted a latch $e$ so balanced that its normal tendency is for the lower portion to swing towards the adjacent head of the coupling member and to permit of this movement the latch passes through a slot $f^1 f^2$ formed in the upper part of the coupler head, the slot being of two widths of which the narrower portion $f^2$ is adjacent or communicates with the hole or holes for the coupling pin.

The latch is provided with projections $e^1$ on either side which can pass through the wider portion of the slot but which extend beyond the sides of the narrower portion of the slot for a purpose hereinafter described.

Figure 2:
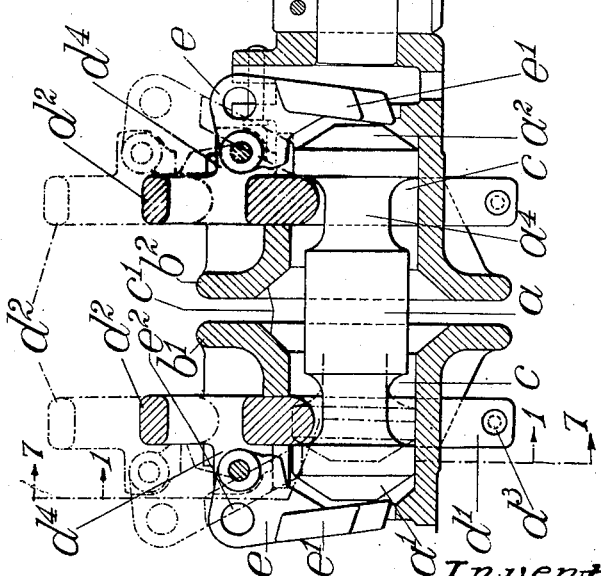
Figure 2 is a section on the line 2—2 of Figure 4.

When two vehicles approach each other and automatic coupling is to take place the respective couplers and coupling parts will be disposed as follows:

One coupler will carry the coupling member in the bore of the coupler head and the coupling pin will be in its lowermost or coupled position, in which position the front of the latch will rest against the end of the coupling member as shown, for example, in full lines for the right hand coupler head seen in Figure 2. The other coupler which will not carry a coupling member will be in its ready-to-couple position, that is, with the coupling pin raised (as shown in dotted lines for the left-hand coupler head in Figure 2) and maintained in the raised position by the projections $e^1$ on the side of the latch resting on the top of either side of the narrow portion $f^2$ of the slot in the upper wall of the coupler head and with the bottom end of the latch projecting into the bore or chamber $c$ of the coupler head.

Figure 1:
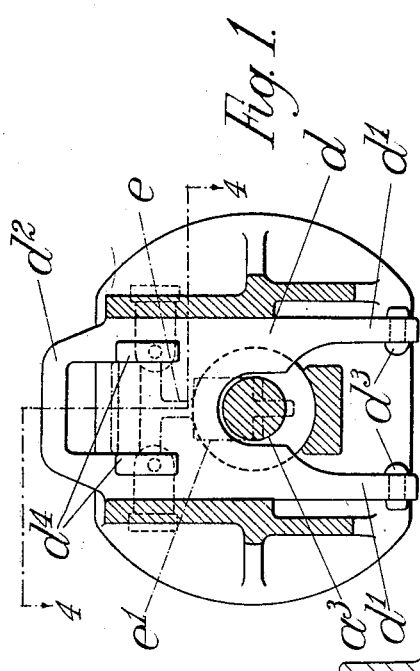
Figure 1 is a part sectional end elevation of a convenient form of coupler in accordance with the invention on the line 1—1 of Figure 2.

When the two vehicles approach the projecting portion of the coupling member in the right-hand coupler enters the bore of the left-hand coupler head which is ready for coupling, the enlarged portion or head $a^1$ of the coupling member passes between the lower ends of the legs $d^1$ of the raised coupling pin until the top of the chamfered outer end or face of the coupling member contacts the front of the bottom end of the latch which is projecting into the bore of the coupler head, and as the couplers continue to approach each other the latch is turned about its pivot in a direction away from the coupling pin, (that is, clockwise in Figure 2) so that the projections $e^1$ on the side of the latch disengage from the narrower portion $f^2$ of the slot in the coupler head, the latch slides down the chamfered end of the coupling member and the coupling pin falls by gravity into its coupled position, that is, with the upper ends of the legs of the coupling pin passing into the inner grooved portion of the coupling member as shown in Figure 1. The couplers are now in their coupled position as shown in full lines in Figure 2 and in operation the draw stresses will be taken by the contacting surfaces between the coupling pins in both coupler heads and the coupling member, while the buffing will be performed by the contacting of the faces of the coupler heads $b^1b^2$.

When uncoupling is to be carried out the coupling pin is raised by means of its handle and carries with it the latch which rides up the chamfered ends of the coupling member, the bottom end of the latch turns by gravity towards the coupling pin, enters the narrow portion of the slot in the coupler head and seats itself on top of the enlarged portion or head of the coupling member, all as shown in the dotted line position on the right-hand coupler head of Figure 2. The coupler is now in the ready to uncouple position; when the vehicles move apart the coupling member withdraws from the coupler head, the enlarged portion or head of the coupling member passes between the lower ends of the legs of the inverted U-shaped coupling pin and releases the latch the bottom end of which was seated on the head of the coupling member. When the head of the coupling member withdraws from under the end of the latch the coupling pin and latch fall until the projections on the sides of the latch seat themselves on top of either side of the narrow portion of the slot in the upper wall of the coupler head leaving the bottom end of the latch projecting into the cylindrical bore or chamber of the coupler head. The coupler is now in the ready to couple position. It will be noted that when the coupling pin is lifted for uncoupling the latch will hold it up irrespective of the mutual position of the two adjacent coupler heads as the latch rests on the coupler member itself.

An alternative arrangement of coupling pin is shown in Figure 8, in which a spring $h$ secured by a washer $j$, and rivet $k$ on top of a cross-piece $l$, connected by rivets $m$ to the lower ends of the legs of the U-shaped coupling pin; the spring when compressed between the bottom of the coupler head and the cross-piece assists in retaining the latch in position when its projections $e^1$ are seated on top of either side of the narrow portion $f^2$ of the slot in the upper wall of the coupler head.

The latch $e$ is provided with finger grip means such as a hole $e^2$ near the top of the latch to enable the lower end of the latch to be manually turned away from the coupling pin and cause the projections on the sides of the latch to be unseated from the top of either side of the narrow portion of the slot in the upper wall of the coupler head so that the latch and the coupling pin can fall to their coupled positions in the coupler head when it is desired that coupling shall not take place or when the coupler is not in service.

The couplers may be connected to the headstock, part of the underframe of a vehicle or to the frame of a bogie truck of a vehicle by known means such as a drawbar passing through the headstock or frame member with draw and buffing springs and spring casings at front and rear of headstock or it may be pivoted by means of a drawbar and swing links supporting the draw and buffing springs at the rear of the headstock or frame. This latter known arrangement is preferred where vehicles have to traverse curves of small radius.

In either of the above and other methods of connection the drawbar may be integral with the coupler head or it may be secured to the coupler head by suitable means such as pins, rivets or cotters or it may be pivotally connected to the coupler head by a vertical or horizontal pin.

Couplers according to this invention are particularly suitable for attachment to goods vehicles or mine cars carrying ore, coal, coke, grain, etc. in which the vehicle is emptied by tipping it on its side or by revolving it on a longitudinal axis. Such vehicles also often have to negotiate sharp curves and cross over roads.

In one application where we propose to employ these couplers each vehicle of a train of vehicles approaches in turn a turntable and cage in which it is revolved on a longitudinal axis and its contents dumped into a pit below the turntable, the centre line of the couplers being the axis about which the vehicle is turned. In this and similar applications the couplers at both ends of the vehicle to be emptied revolve with the vehicle whilst the couplers on the vehicles in front and behind the vehicle to be emptied remain stationary with their vehicles. This is achieved in the automatic couplers constructed according to this invention by making the coupling member and inside walls of the coupler head of substantially circular cross section, the coupling member being capable of revolving between the legs of the coupling pin in the coupler head, the inverted position of the coupler being shown in Figure 3.

When the couplers turn with the vehicle to which they are fitted, locks $g$ hinged between lugs formed on either side of the top of the coupler head by means of pins or rivets $g^1$ turn by gravity into a position in which the lips or projecting sides $g^2$ of the locks move under the rearwardly extending projections $d^4$ on the coupling pin to which the latch is mounted and retain the coupling pin and latch in their coupled positions as shown in Figure 5. These locks serve another useful purpose as shown in Figure 6. When the coupling pin is raised and the hinged lock on top of the coupler head is turned to the vertical position, the lip $g^2$ again engages under the member $d^4$ and the coupling pin is retained in its inoperative position so that buffing without coupling can take place.

Under certain conditions it may be found desirable always to retain the coupling members in the coupler heads either at the front or rear of vehicles and it is perhaps better to do so for instance if the vehicles are not to be turned round end for end on the track.

Coupling members can be retained in the coupler heads of couplers made according to the invention either at the front or rear of the vehicles as desired in the following manner:

Assume the coupling member is in the head of the coupler in which it is to be retained and the coupling pin and latch are in their coupled positions, the locks $g$ are raised to a vertical position when the lips or projecting sides $g^2$ of the locks surmount the tops of the rearwardly extending projections $d^4$ on the coupling pin. The locks $g$ have holes $g^3$ through which a bolt, rivet, pin or the like can be passed to secure the locks in this position with the lips of the locks surmounting the projections on the coupling pin. With the locks in this position the coupling pin cannot be lifted in the coupler head, and the coupling member therefore will be retained or locked in the coupler head. If the couplers with the coupling members locked in their coupler heads are at the front of each of the vehicles in a train the couplers at the rear of each of these vehicles will be without coupling members.

It will be understood that the foregoing details of construction are given by way of example only to indicate the nature of the invention and not to limit its scope, and we may vary the form of coupler head, coupling member, coupling pin, latch and lock of the couplings herein described to suit the practical requirements of the vehicles or railway that may have to be fulfilled. For example, the heads $a^1 a^2$ of the coupling member may be made somewhat spherical and the outer ends $c^1$ of the cylindrical bore of the coupler heads may be formed with a radius.

We claim:

1. A coupling for railway vehicles and the like comprising in combination a coupling member adapted to be inserted into the coupler head of a vehicle, a coupling pin adapted to be inserted into the coupler head to retain the coupling member in position in the coupler head, and latch means carried by the coupling pin to hold the same in uncoupled position and to effect automatic coupling and passing through a slot formed in the upper part of the coupler head, the slot being of two widths of which the narrower portion is nearer the coupling pin and said latch means being provided with projections on each side which can pass through the wider portion of the slot but which extend beyond the sides of the narrower portion of the slot.

2. A coupling according to claim 1 in which the coupling member and coupling pin are shaped so that a coupled vehicle may be tipped or revolved about a longitudinal axis for emptying.

3. A coupling according to claim 1 in which the coupling member adapted to be inserted into the coupler head is formed with enlarged head portions and with an enlarged centre portion separated from the head portions by grooved parts.

4. A coupling according to claim 3 in which the coupling pin is of U-shape and has the lower ends of the legs spaced sufficiently far apart to allow the head of the coupling member to pass between them while the upper ends of the legs are spaced closer together and the insides of these upper parts are suitably shaped to pass into the grooved part and in front of the head portion of the coupling member.

5. A coupling according to claim 1 in which finger grip means are provided in the latch means whereby the latch may be released to put the coupler out of service.

6. A coupling for railway vehicles and the like comprising in combination a coupling member adapted to be inserted into the coupler head of a vehicle, a coupling pin adapted to be inserted into the coupler head to retain the coupling member in position in the coupler head and a latch carried by the coupling pin to hold the same in uncoupled position and to effect automatic coupling, said latch being pivotally mounted between rearwardly extending lugs on the coupling pin and passing through a slot formed in the upper part of and projecting into the coupler head and being so balanced that its normal tendency is for its lower portion to swing towards the adjacent head of the coupling member, said slot being of two widths of which the narrower portion is nearer the coupling pin and said latch having projections on each side which can pass through the wider portion of the slot but which extend beyond the sides of the narrower portion of the slot.

7. A coupling according to claim 6 comprising a spring adapted to be compressed between the bottom of the coupler head and the coupling pin to assist in retaining the projecting sides of the pivoted latch in position on either side of said narrow slot in the top of the coupler head.

8. A coupling according to claim 6 in which the outer face of the head of coupling member has chamfered ends.

9. A coupling for railway vehicles and the like comprising in combination a coupling member adapted to be inserted into the coupler head of a vehicle the coupling member and coupler head being so shaped that a coupled vehicle may be tipped or revolved about a longitudinal axis for emptying, a coupling pin adapted to be inserted into the coupler head to retain the coupling member in position in the coupler head, latch means carried by the coupling pin to hold the same in uncoupled position and projecting into the coupler head so as to be engaged by the coupler member to effect automatic coupling, and locking means operating when a coupled vehicle is tipped or revolved about a longitudinal axis in order to retain the coupling pin in the coupled position.

10. A coupling according to claim 9 comprising locks hinged between lugs formed on either side of the top of the coupler head and adapted to turn by gravity when the coupler turns with the vehicles to which it is fitted, and lips or projecting sides on the hinged locks which when the locks turn by gravity move under the rearwardly extending projections on the coupling pin to retain the coupling pin and the latch in their coupled positions.

11. A coupling according to claim 9 in which, the rearwardly extending projections on the coupling pin are so shaped that after raising the coupling pin in the coupler head, the locks on either side of the top of the coupler head can be turned to a vertical position in which the projecting sides of the locks engage under the rearwardly extending projections on the coupling pin to hold the coupling pin in a neutral position to enable buffing without coupling to take place.

12. A coupling according to claim 10 in which holes are provided in the locks for the reception of a bolt or rivet to secure the locks in a vertical position in which the projecting sides of the locks surmount the rearwardly extending projections on the coupling pin thus locking the coupling member in the coupler head.

JOHN CECIL GEORGE COSSEY.
GEORGE HENRY SMITH.

REFERENCES CITED

The following references are of record in the file of this patent:

UNITED STATES PATENTS

| Number | Name | Date |
| --- | --- | --- |
| 340,298 | Eakin | Apr. 20, 1886 |
| 453,978 | Frantz | June 9, 1891 |
| 469,340 | Frantz | Feb. 26, 1892 |
| 1,680,115 | Robinson | Aug. 7, 1928 |